(12) United States Patent
Hirzallah et al.

(10) Patent No.: US 11,943,758 B2
(45) Date of Patent: Mar. 26, 2024

(54) TECHNIQUES FOR USING CLASSES FOR BEAM-BASED CHANNEL ACCESS

(71) Applicant: QUALCOMM Incorporated, San Diego, CA (US)

(72) Inventors: Mohammed Ali Mohammed Hirzallah, San Diego, CA (US); Arumugam Chendamarai Kannan, San Diego, CA (US); Srinivas Yerramalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 123 days.

(21) Appl. No.: 17/495,615

(22) Filed: Oct. 6, 2021

(65) Prior Publication Data
US 2023/0104623 A1    Apr. 6, 2023

(51) Int. Cl.
*H04W 72/044* (2023.01)
*H04W 74/08* (2009.01)

(52) U.S. Cl.
CPC ........ *H04W 72/046* (2013.01); *H04W 74/08* (2013.01)

(58) Field of Classification Search
CPC ... H04W 16/14; H04W 16/28; H04W 72/046; H04W 74/08; H04B 7/0695; H04B 7/0617; H04B 7/088
See application file for complete search history.

(56) References Cited

U.S. PATENT DOCUMENTS

| 2020/0267736 | A1* | 8/2020 | Hafeez | H04W 72/0446 |
| 2021/0251002 | A1* | 8/2021 | Sun | H04W 74/0808 |
| 2022/0124799 | A1* | 4/2022 | Hu | H04W 24/08 |

* cited by examiner

*Primary Examiner* — Quoc Thai N Vu
(74) *Attorney, Agent, or Firm* — ArentFox Schiff LLP

(57) ABSTRACT

Aspects described herein relate to configuring a beam for communicating over a wireless channel, where the beam is associated with a channel access class based on a threshold for channel access and having at least one of a defined channel occupancy time (COT) or a defined minimum gap between communications, and communicating over the wireless channel using the beam and based on at least one of the defined COT or the defined minimum gap.

26 Claims, 5 Drawing Sheets

TECHNIQUES FOR USING CLASSES FOR BEAM-BASED CHANNEL ACCESS

BACKGROUND

Aspects of the present disclosure relate generally to wireless communication systems, and more particularly, to beam-based channel access.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In some wireless communication technologies, such as 5G NR, a node communicating in a wireless network, such as a user equipment (UE), base station, etc., can beamform wireless communications by selectively using antenna resources to achieve a spatial direction for a beam. The node can generate the beam in various directions or widths. In some examples, a node can use a narrow beam to transmit or receive wireless communications, where a narrow beam can be subject to, or may cause, less interference than a wide beam.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, an apparatus for wireless communication is provided that includes a transceiver, a memory configured to store instructions, and one or more processors communicatively coupled with the memory and the transceiver. The one or more processors are configured to execute the instructions to cause the apparatus to configure a beam for communicating over a wireless channel, wherein the beam is associated with a channel access class based on a threshold for channel access and having at least one of a defined maximum channel occupancy time (COT) or a defined minimum gap between communications, and communicate over the wireless channel using the beam and based on at least one of the defined COT or the defined minimum gap.

In another aspect, a method for wireless communication at a node is provided that includes configuring a beam for communicating over a wireless channel, wherein the beam is associated with a channel access class based on a threshold for channel access and having at least one of a defined COT or a defined minimum gap between communications, and communicating over the wireless channel using the beam and based on at least one of the defined COT or the defined minimum gap.

In another aspect, an apparatus for wireless communication is provided that includes means for configuring a beam for communicating over a wireless channel, wherein the beam is associated with a channel access class based on a threshold for channel access and having at least one of a defined maximum COT or a defined minimum gap between communications, and means for communicating over the wireless channel using the beam and based on at least one of the defined COT or the defined minimum gap.

In another aspect, a computer-readable medium including code executable by one or more processors for wireless communications is provided. The code includes code for configuring a beam for communicating over a wireless channel, wherein the beam is associated with a channel access class based on a threshold for channel access and having at least one of a defined maximum COT or a defined minimum gap between communications, and communicating over the wireless channel using the beam and based on at least one of the defined COT or the defined minimum gap.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
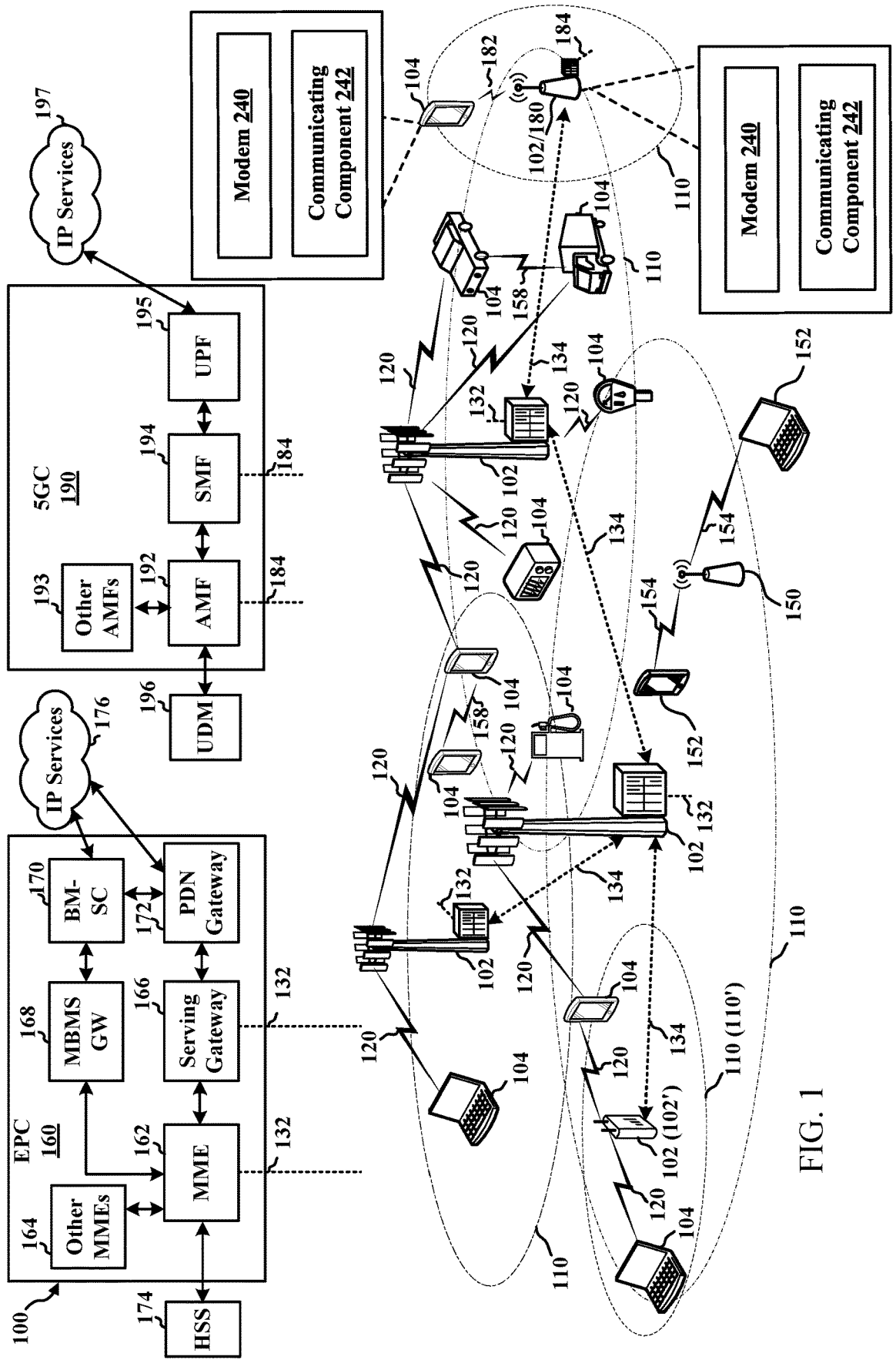
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to classifying beams that are used by a node in wireless communications into classes, and using the beams based on one or more parameters associated with its class. For example, millimeter wave (mmWave) and sub-terahertz (THz) frequencies offer abundance of unlicensed spectrum bands. Transmission and reception over these bands may be directional, resulting in interference-limited wireless environment. Depending on the operating scenario, performing Listen-Before-Talk (LBT) and/or Long-Term (LT) Sensing might not be required. To resolve potential "beam collisions", LBT and LT Sensing can be combined with other coexistence methods, such as using a narrow beam. As used herein, the term "narrow beam" can refer to a geometrical shape of the beam as being within a threshold angular spread, interference caused to or by the beam as being within a narrow space, and/or the like.

Some wireless communication technologies define various beams, such as European Telecommunications Standards Institute (ETSI) European Standard (EN) 303 753 (also known as "C2"), that can be used by nodes in wireless communications. C2 beams, for example, can be applicable to mobile and fixed nodes. In addition, for C2 beams, LBT may be skipped at either side with minimum antenna gain requirements, but some mitigation technique may be used in the absence of sufficient antenna gain. 3GPP technologies define other beams as well, such as EN 302 567 (also known as "C1") and EN 303 722 (also known as "C3"). Aspects described herein may be applied to beams, such as C2, that may not require use of LBT, but may also apply to other types of beams, such as C1 and/or C3.

Aspects described herein relate to using Channel Access Classes (CACCs) for narrow beam-based channel access. In an example, for each CACC, a threshold of narrow beam-based channel access condition can be defined, which can be used to determine whether the node can access the channel using the beam (e.g., with or without LBT or otherwise). In another example, each CACC may have an associated limit on its channel occupancy time (COT) and/or may have a gap between channel access times. Aspects described herein may apply to downlink channel access, uplink channel access, sidelink channel access, or the like. In addition, for example, CACCs for narrow beam channel access may apply to transmitter and/or receiver sides of a communication link.

In accordance with aspects described herein, providing CACCs and associated parameters for beams used by one or more nodes may allow for limiting interference caused by the beams, enhancing channel utilization for different traffic classes, etc. For example, providing different classes for the beams based on known beam properties can allow for maximizing usage of the beams, such that beams known to have desirable properties may be used without restriction or with lowered restrictions on COT, gap, etc., as these beams may have a lowered chance of interfering with beams from other nodes. In another example, beams known to have comparatively not as desirable properties may be used with some restrictions on COT, gap, etc. to limit interference possibly caused by the beams, lessen channel access times where other competing/possibly interfering beams desire to use the channel, etc. This can improve communication quality for multiple nodes in a wireless network.

The described features will be presented in more detail below with reference to FIGS. 1-5.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system, such as a UE 104, base station 102, or other nodes, may have a modem 240 and communicating component 242 for beam-based channel access using beam classes, in accordance with aspects described herein. Though a UE 104 and base station 102 are shown as having the modem 240 and communicating component 242, this is one illustrative example, and substantially any node or type of node may include a modem 240 and communicating component 242 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
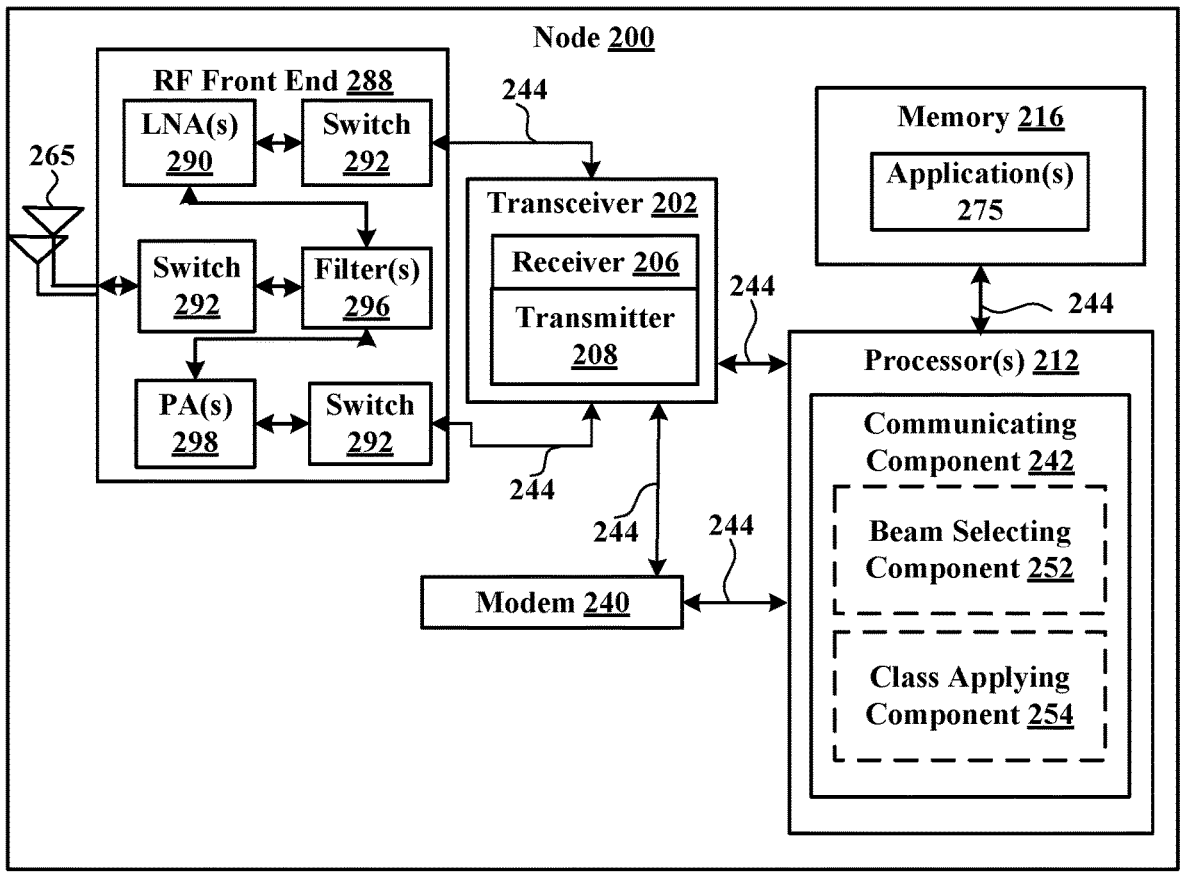
FIG. 2 is a block diagram illustrating an example of a node for wireless communications, in accordance with various aspects of the present disclosure.
Figure 3:
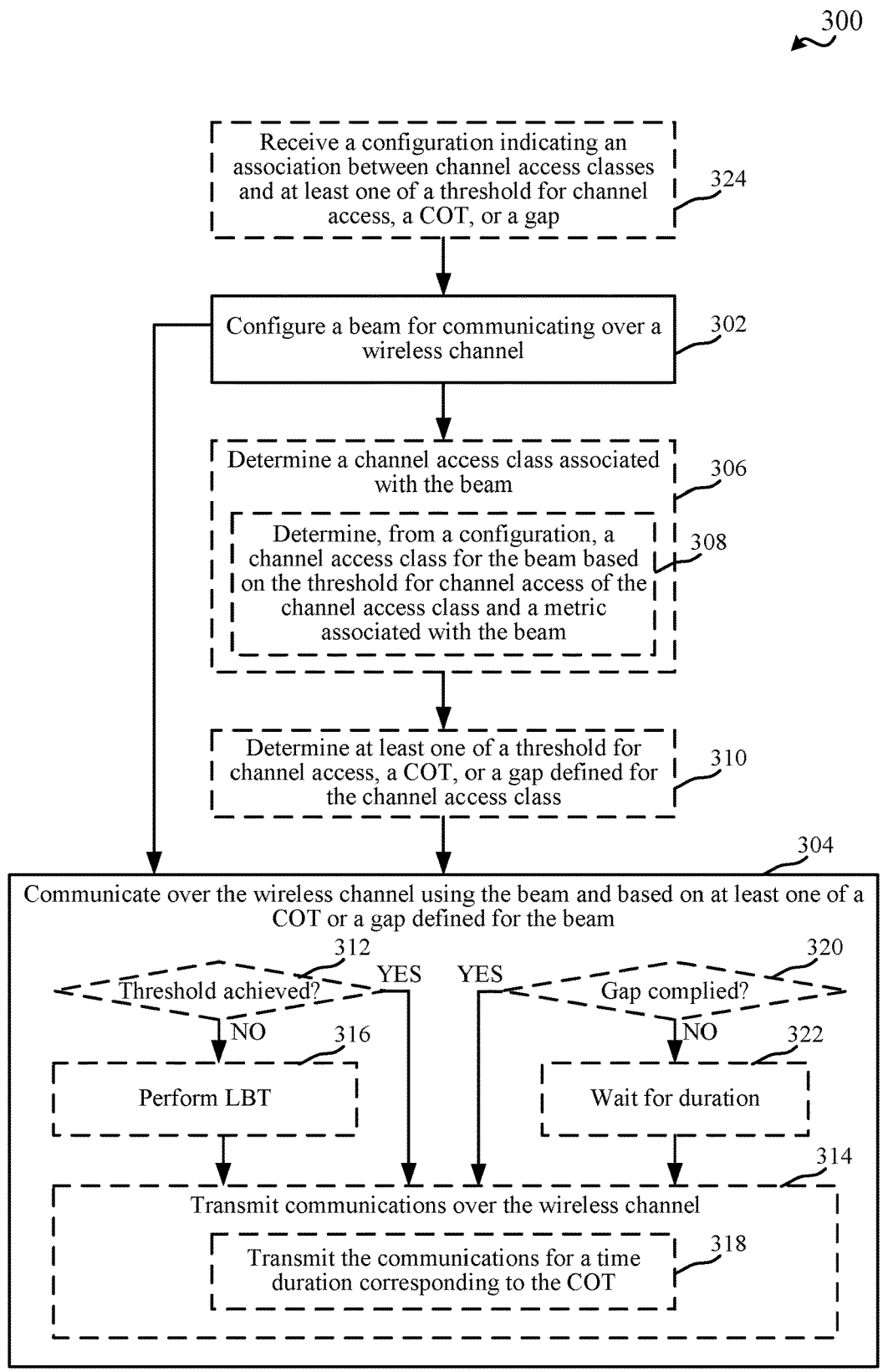
FIG. 3 is a flow chart illustrating an example of a method for communicating over a wireless channel based on a channel access class of a beam, in accordance with aspects described herein.

In an example, a communicating component 242 of a first node can configure a beam for communicating with a second node Turning now to FIGS. 2-5, aspects are depicted with reference to one or more components and one or more methods that may perform the actions or operations described herein, where aspects in dashed line may be optional. Although the operations described below in FIG. 3 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 2, one example of an implementation of node 200 for wireless communications is illustrated, which may include a base station 102, a UE 104, or another node, as described above. Node 200 may include a variety of components, some of which have already been described above and are described further herein, including components such as one or more processors 212 and memory 216 and transceiver 202 in communication via one or more buses 244, which may operate in conjunction with modem 240 and/or communicating component 242 for beam-based channel access using beam classes, in accordance with aspects described herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when node 200 is operating at least one processor 212 to execute communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, node 200 may include RF front end 288, which may operate in communication with one or more antennas 265 and transceiver 202 for receiving and transmitting radio transmissions, for example, wireless communications transmitted by at least one base station 102 or wireless transmissions transmitted by node 200. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that node 200 can communicate with one or more other nodes, for example, one or more base stations 102 or one or more cells associated with one or more base stations 102, one or more UEs 104, etc. In an aspect, for example, modem 240 can configure transceiver 202 to operate at a specified frequency and power level based on the configuration of the node 200 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of node 200 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on configuration information associated with node 200 as provided by the network during cell selection and/or cell reselection.

In an aspect, communicating component 242 can optionally include a beam selecting component 252 for selecting or otherwise configuring a beam for communicating with another node, and/or a class applying component 254 for applying a class (e.g., a CACC) or one or more related parameters to the beam and/or to communications using the beam, in accordance with aspects described herein.

In an aspect, the processor(s) 212 may correspond to one or more of the processors described in connection with the UE in FIG. 5. Similarly, the memory 216 may correspond to the memory described in connection with the UE in FIG. 5.

FIG. 3 illustrates a flow chart of an example of a method 300 for communicating over a wireless channel based on a channel access class of a beam, in accordance with aspects described herein. In an example, a node 200 can perform the functions described in method 300 using one or more of the components described in FIGS. 1 and 2.

In method 300, at Block 302, a node can configure a beam for communicating over a wireless channel. In an aspect, beam selecting component 252, e.g., in conjunction with processor(s) 212, memory 216, transceiver 202, communicating component 242, etc., can configure the beam for communicating over the wireless channel. For example, beam selecting component 252 can obtain a configuration from another node in the wireless network indicating which beam to use. For example, node 200 can be a UE 104 that receives a configuration from a base station 102 indicating which beam to use, spatial properties of the beam, a transmission configuration indicator (TCI) state identifying the beam or a quasi-colocation (QCL) of the beam, etc. In another example, beam selecting component 252 can perform beam training with another node of the wireless network to determine a beam to use in communicating with the other node (e.g., a beam or beam pair having a most desirable or highest signal-to-noise ratio (SNR) or other metric, etc.). In yet another example, beam selecting component 252 can indicate to another node in the wireless network which beam it is using. In another example, beam selecting component 252 can receive, from another node in the wireless network, an indication of which beam the other node in the wireless network is using and can configure its beam based on the indication.

In addition, in other examples, beam selecting component 252 can determine which beam to use based on configured properties of the beam, which may include a CACC of the beam, as described further herein. For example, given a list of beams configured by another node (e.g., where the node 200 is a UE 104 given, from a base station 102, a list of beams configured for use by the UE 104), beam selecting component 252 may configure the beam based on one or more properties described above, and/or based on a CACC or associated parameters of the beam. For example, if a beam that complies with thresholds of a CACC, as described in further detail below, is configured by the base station 102, beam selecting component 252 may determine to configure this beam for use in communicating with the base station 102. In addition, for example, beam selecting component 252 may determine to configure a beam from the list based on CACC of the beam and intended communications using the beam (e.g., a beam with a higher priority CACC for higher priority or reliability communications).

In method 300, at Block 304, the node can communicate over the wireless channel using the beam and based on at least one of a COT or a gap defined for the beam. In an aspect, class applying component 254, e.g., in conjunction with processor(s) 212, memory 216, transceiver 202, communicating component 242, etc., can communicate over the wireless channel using the beam and based on at least one of the COT or the gap defined for the beam. For example, one the CACC for the beam is determined, the other parameters can be determined for the CACC, such as the COT or the gap, and class applying component 254 can apply the one or more parameters in communicating using the beam. In one specific example, as described herein, class applying component 254 can determine which CACC applies to the beam based on whether the beam complies with a threshold for the CACC, and then the class applying component 254 can determine the COT and/or gap that applies to that CACC. For example, the CACCs and associated parameters can be defined for the node (e.g., for a UE 104 or base station 102) to use in communicating in a wireless network. An example of a table of CACCs is shown below.

| CACC | Threshold X for $M_{j,i}$ | Maximum COT | Minimum Gap $G_l$ |
|---|---|---|---|
| CACC 1 | $X_1$ | $T_1$ | $G_1$ |
| CACC 2 | $X_2$ | $T_2$ | $G_2$ |
| ... | ... | ... | ... |
| CACC L | $X_l$ | $T_l$ | $G_l$ |
| CACC 0 | $X_0$ | No Restriction | No gap required |

In the above table, for example, $M_{j,1}$ can be a metric for narrow-beam channel access (e.g., for accessing a wireless channel without performing LBT), and X can be the threshold for which the condition $M_{j,i} > X$ allows a device to access the channel without LBT using beam j. For example, $M_{j,i}$ metric can be considered as effective isotropic radiated power (EIRP) value (possibly with offset) that corresponds to a target kth percentile of EIRP measurements or a difference between EIRP values that correspond to two different percentiles. In this example, multiple priority classes for narrow-beam channel access can limit interference and enhance channel utilization for different traffic classes. For example, the $l_{th}$ narrow-beam CACC can be characterized by its narrow beam threshold, $X_l$, a maximum COT duration, $T_l$, and/or a minimum gap, $G_l$, to be used between communications using the beam. The 0th narrow beam CACC can have a most stringent threshold, $X_0$, but may have no restriction on COT duration and/or no gap requirement. In general, for example, the narrower the beam is the longer the COT duration (e.g., $T_1 \geq T_2 \geq \ldots \geq T_l$ for $X_0 \geq X_1 \geq X_2 \geq \ldots \geq X_L$).

In an example, the narrow beam metric, say for beam j, can be defined based on the EIRP minus constant b at different percentiles (e.g., $k_1$th, $k_2$th, $k_1$th, where $k_3 < k1$, $k2 < k1$) of the distribution of radiated power measured over the full sphere around the transmitter, while the transmitter is configured with beam j. In this example, $M_{j,1} = k1\text{th·tile}(\{EIRP_i : i \in E_j\}) - k2\text{th·tile}(\{RIRP_i : i \in E_j\})$ where $E_1$ is the set of EIRPs captured in spherical measurement for beam j. In addition, in this example, $M_{j,2} = k3\text{th·tile}(\{EIRP_i - b : i \in E_j\})$ where $E_j$ is the set of EIRPs captured in spherical measurement for beam j and b is a constant (e.g., $P_{max}$). $M_{j,2}$ can indicate the gain. A device can pass the narrow beam condition for beam j, if $M_{j,1}$ is greater than a predefined threshold, X. A device can pass the narrow beam condition for beam j, if $M_{j,1}$ is greater than a predefined threshold, X, or $M_{j,2}$ is less than a threshold, Z. The analysis of beams and associated narrow beam metrics can be performed offline or in a lab, and results can be hardcoded or stored in a memory of a device (e.g., memory 216 of node 200). In this example, beam selecting component 252 can use the narrow beam metrics of various beams in mapping the beams to CACCs (e.g., based on indicated thresholds for the narrow beam metrics for the CACCs) or otherwise for selecting a beam and/or related parameters to use for wireless communications, as described herein.

For example, in method 300, optionally at Block 306, the node can determine a channel access class associated with the beam. In an aspect, class applying component 254, e.g., in conjunction with processor(s) 212, memory 216, transceiver 202, communicating component 242, etc., can determine the channel access class associated with the configured beam. In one example, this can include, at Block 308, determining, from a configuration, a channel access class for the beam based on the threshold for channel access of the channel access class and a metric associated with the beam. In one example, as described, the node 200 can store narrow beam signal metrics (e.g., EIRP, cumulative distribution function (CDF) of EIRP, etc.) for various possible beams that can be configured at the node 200 (e.g., as hardcoded in memory or otherwise received in a separate configuration). In this example, class applying component 254 can determine CACCs for the various possible beams based on with which threshold (e.g., threshold X for $M_{j,i}$) of which CACC each of the beams complies. For example, the CACC for the beam can be based on a determination that at least one of the EIRP spherical measurement, or CDF thereof, of the beam achieves the threshold. In another example, class applying component 254 can determine the CACCs for beams in a configuration of beams received from another node (e.g., from a base station 102, where node 200 is a UE 104) and known or determined narrow beam signal metrics for the beams in the configuration. In an example, the configuration can include the configuration received at Block 324, as described in further detail herein.

In an example, the configuration can indicate a smallest gap for a highest priority CACC of the CACCs. For example, the priority can correspond to an index of the CACC (e.g., CACC 0 can be highest priority) and can be indicated based on threshold (e.g., the CACC having the highest threshold X for $M_{j,i}$ can be CACC 0). In other examples, the configuration can indicate a largest gap for a highest priority CACC of the CACCs, a same gap for each of the CACCs, etc. In other examples, the configuration can indicate, for a CACC of the CACCs having a highest threshold, at least one of no limit on the defined COT or a defined gap of zero. In other examples, the configuration can indicate the defined gap as a fixed gap for multiple ones of the CACCs, or the defined gap for each of the CACCs as proportional to the defined COT for each of the CACCs, where the defined COT for each of the CACCs can be less than or equal to a defined maximum COT for each of the CACCs. In other examples, the configuration can indicates the defined gap for each of the channel access classes as a minimum or maximum of a fixed gap or a proportional gap that is proportional to the defined COT for each of the CACCs, where the defined COT for each of the CACCs can be less than or equal to a defined maximum COT for each of the CACCs.

In method 300, optionally at Block 310, at least one of a threshold for channel access, a COT, or a gap defined for the channel access class can be determined. In an aspect, class applying component 254, e.g., in conjunction with processor(s) 212, memory 216, transceiver 202, communicating component 242, etc., can determine at least one of the threshold for channel access, the COT, or the gap defined for the channel access class of the configured beam. In this example, class applying component 254 can use the threshold for channel access, the COT, and/or the gap for subsequent communications using the beam, in accordance with examples described in further detail below.

For example, in communicating over the wireless channel at Block 304, optionally at Block 312, the node can determine whether the threshold for channel access is achieved by the configured beam. In an aspect, class applying component 254, e.g., in conjunction with processor(s) 212, memory 216, transceiver 202, communicating component 242, etc., can determine whether the threshold for channel access is achieved by the configured beam. If so, optionally at Block 314, the node can transmit communications over the wireless channel without performing LBT. In an aspect, communicating component 242, e.g., in conjunction with processor(s) 212, memory 216, transceiver 202, etc., can transmit the communications over the wireless channel without performing LBT. If the threshold is not achieved at Block 312, optionally at Block 316, the node can perform LBT. In an aspect, communicating component 242, e.g., in conjunction with processor(s) 212, memory 216, transceiver 202, etc., can perform LBT, which can include performing a clear channel assessment (CCA), such as by transmitting a request to send signal, receiving one or more clear to send signals, etc. Once the channel is clear, in this example, communicating component 242 can transmit the communications over the wireless channel (e.g., at Block 314).

In an example, in transmitting communications over the wireless channel at Block 314, optionally at Block 318, the node can transmit the communications for a time duration corresponding to the COT. In an aspect, communicating component 242, e.g., in conjunction with processor(s) 212, memory 216, transceiver 202, etc., can transmit the communications for the time duration corresponding to the COT. As described, for example, the CACC of the beam can have an associated COT (or maximum COT), and the communicating component 242 can transmit the communications for the COT or not to exceed a time duration of the COT for the CACC of the beam.

In another example, in communicating over the wireless channel at Block 304, optionally at Block 320, the node can determine whether a gap is complied with in communicating over the wireless channel. In an aspect, communicating component 242, e.g., in conjunction with processor(s) 212, memory 216, transceiver 202, etc., can determine whether the gap is complied with. As described, for example, the CACC of the beam can have an associated gap that may be required between communications using a beam of the CACC. Thus, for example, communicating component 242 can determine whether the gap is complied with between a previous communication over the wireless channel and the current communication over the wireless channel.

If the gap is complied with at Block 320, optionally at Block 314, the node can transmit communications over the wireless channel, as described above and/or according to the COT. If the gap is not complied with at Block 320, optionally at Block 322, the node can wait for a duration, which can comply with the gap. In an aspect, communicating component 242, e.g., in conjunction with processor(s) 212, memory 216, transceiver 202, etc., can wait for the duration. For example, communicating component 242 can determine the duration as a difference between a time since transmitting a previous communication over the wireless channel using the beam and the required minimum gap for the CACC of the configured beam. After the duration, communicating component can transmit the communication over the wireless channel (e.g., at Block 314), as described above. An example is shown in FIG. 4.

Figure 4:
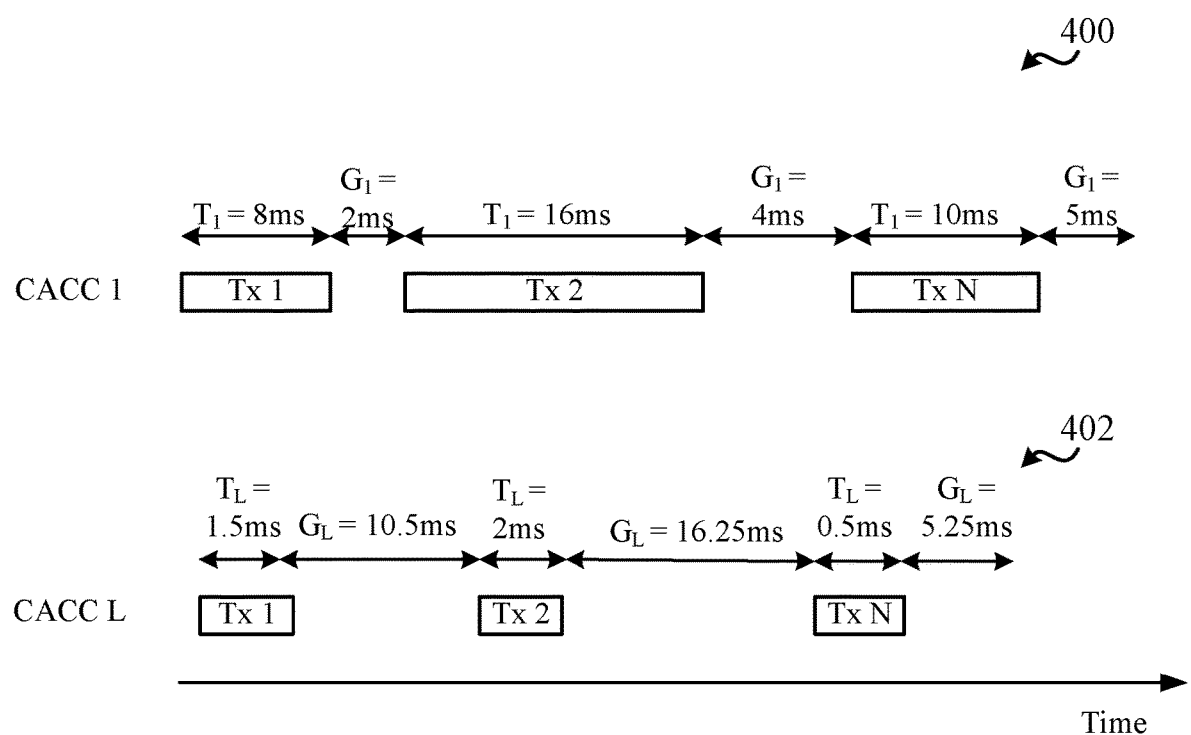
FIG. 4 illustrates examples of transmission timelines for transmitting over a wireless channel based on a channel access class of a beam, in accordance with aspects described herein.

FIG. 4 illustrates an example of a transmission timeline 400 for CACC 1 and transmission timeline 402 for CACC L (e.g., from the table above). In transmission timeline 400 for CACC 1, a first transmission, Tx 1, can occur for a COT of $T_1=8$ milliseconds (ms), followed by a gap $G_1=2$ ms, followed by a second transmission, Tx 2, for a COT of $T_1=16$ ms, followed by a gap $G_1=4$ ms, followed by a third transmission, Tx 3, for a COT of $T_1=10$ ms, followed by a gap $G_1=5$ ms. In this example, CACC 1 may have a defined maximum COT of 16 ms and a defined minimum gap of at least 2 ms. Thus, for a beam in CACC 1, the node can comply with the COT and gap for CACC 1 in transmitting over a wireless channel using the beam. In transmission timeline 402 for CACC L, a first transmission, Tx 1, can occur for a COT of $T_L=1.5$ ms, followed by a gap $G_L=10.5$ ms, followed by a second transmission, Tx 2, for a COT of $T_L=2$ ms, followed by a gap $G_L=16.25$ ms, followed by a third transmission, Tx 3, for a COT of $T_L=0.5$ ms, followed by a gap $G_L=5.25$ ms. In this example, CACC L may have a defined maximum COT of 2 ms and a defined minimum gap of at least 5.25 ms. Thus, for a beam in CACC L, the node can comply with the COT and gap for CACC L in transmitting over a wireless channel using the beam. In an example, CACC L may have a lower threshold narrow beam metric, but may have lower COT and higher gap, as compared to CACC 1, to mitigate interference, as described herein.

In an example, a node can vacate the channel for the gap duration $G_l$ after accessing the channel (this ensures channel is not occupied continuously). The gap can be configured and/or determined by the node based on various options. In one example, each CACC can have its own fixed gap requirement irrespective of COT duration $\tilde{T}_l$ (e.g., gap is $G_l=Y$ seconds for the lth CACC, where Y depends on the CACC). In another example, each priority class can have its variable gap that is proportional to its COT duration $\tilde{T}_l$ (e.g., gap is $G_l=\eta_l\tilde{T}_l$ seconds for the lth CACC and $\tilde{T}_l \le T_l$, where $\eta_l$ depends on the CACC and can be above 1). In another example, each priority class can have its variable gap, where gap is $G_l=\min(\eta_l T_l, Y_l)$ seconds for the lth CACC, which can be the least conservative example. In another example, each priority class can have its variable gap, where gap is $G_l=\max(\eta_l T_l, Y_l)$ seconds for the lth CACC, which can be the most conservative example. In addition, for example, relation of gap duration among different CACCs, e.g., $G_1$, $G_2, \ldots, G_L$ can be set based on one or more objectives, such as one or more of: (1) the highest priority CACC, e.g., the one that has the narrowest beam, has the smallest max. gap, i.e., $G_1 \le G_2 \le \ldots \le G_L$, (2) the highest priority CACC, e.g., the one that has the narrowest beam, has the largest max. gap, i.e., $G_1 \ge G_2 \ge \ldots \ge G_L$, or (3) all priority CACCs have similar gap requirement, i.e., $G_1=G_2=\ldots=G_L$.

One specific, non-limiting, example of a CACC configuration is shown below.

| CACC | Threshold X | Maximum COT | Minimum Gap $G_l$ |
|---|---|---|---|
| CACC 1 | 12 decibel (db) | 20 ms | $\min(\eta_1\tilde{T}_1, Y_1)$; $\eta_1 = 2$, $Y_1 = 10$ ms, $\tilde{T}_1 \le 20$ ms |
| CACC 2 | 10 db | 10 ms | $\min(\eta_2\tilde{T}_2, Y_2)$; $\eta_2 = 4$, $Y_2 = 15$ ms, $\tilde{T}_2 \le 10$ ms |
| ... | ... | ... | ... |
| CACC L | 6 db | 2 ms | $\min(\eta_L\tilde{T}_L, Y_L)$; $\eta_L = 20$, $Y_L = 20$ ms, $\tilde{T}_L \le 2$ ms |
| CACC 0 | 15 db | No Restriction | No gap required |

In this example, for CACC 0, the node can access the channel using a very narrow pencil beam for unlimited COT duration, and/or COT can be limited by other factors. For CACC 1, the node can access the channel using a narrow beam that can cause some tolerable interference for 20 milliseconds COT duration (e.g., sending enhanced mobile broadband (eMBB) traffic). For CACC 2, the node can access the channel using a narrow beam that can cause some tolerable interference for 10 milliseconds COT duration (e.g., sending video/voice traffic). For CACC L, the node can access the channel using a wide beam that causes some interference for 2 milliseconds COT duration (e.g., sending low latency traffic/control messages).

In method 300, optionally at Block 324, the node can receive a configuration indicating an association between channel access classes and at least one of a threshold for channel access, a COT, or a gap. In an aspect, class applying component 254, e.g., in conjunction with processor(s) 212, memory 216, transceiver 202, communicating component 242, etc., can receive the configuration indicating the association between channel access classes and at least one of a threshold for channel access, a COT, or a gap. As described, for example, class applying component 254 can obtain the configuration from a hardcoding in memory 216, from another node in the wireless network (e.g., from a base station 102 where node 200 is a UE 104), etc. In an example, as described, class applying component 254 can associate beams available for communicating at the node 200 with CACCs specified in the configuration for accordingly determining at least a COT or gap to be associated with the beams based on CACC. In one example, class applying component 254 can determine the CACC for a configured beam based on comparing a narrow beam channel access metric of the beam with the threshold indicated for the CACC, as described above.

Figure 5:
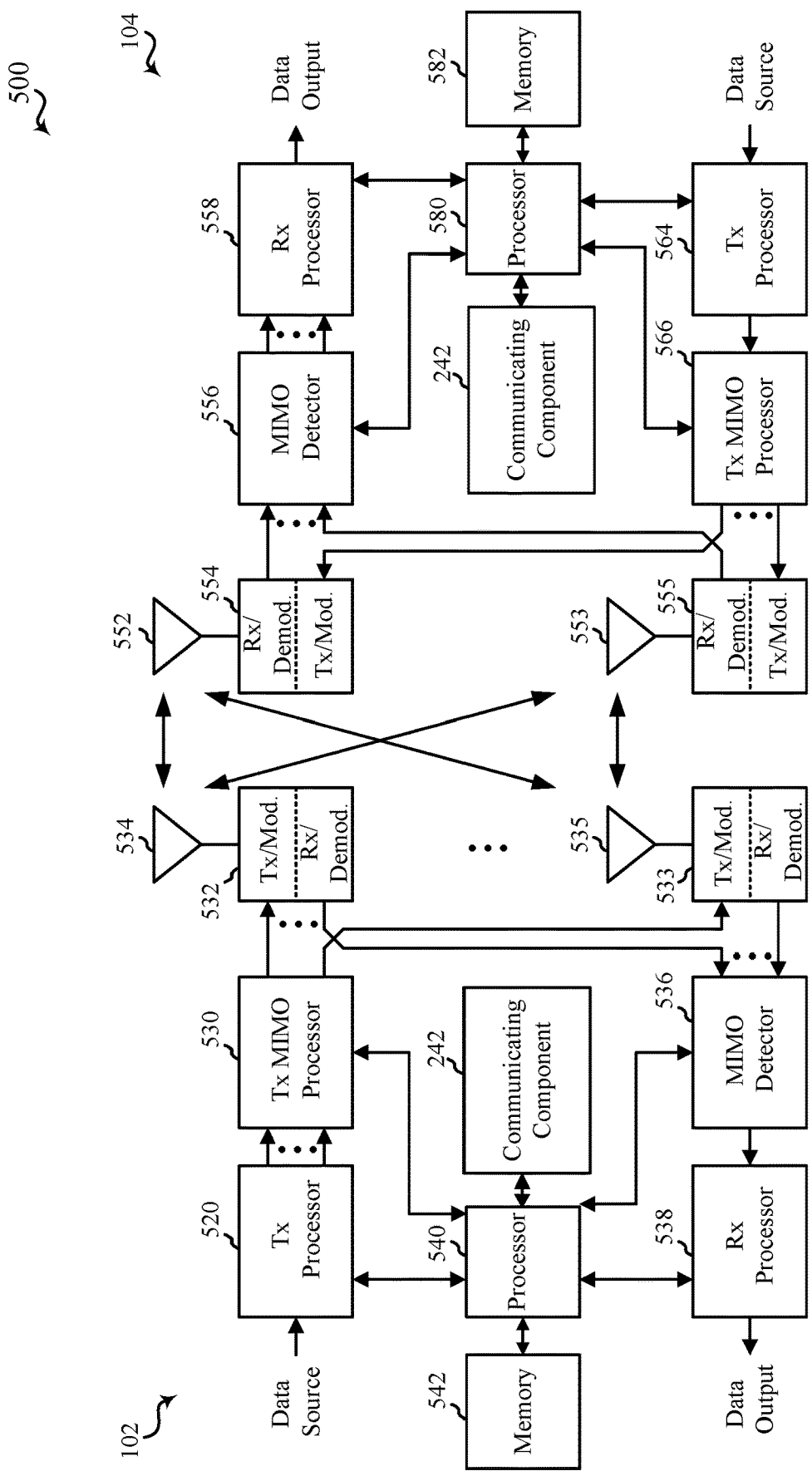
FIG. 5 is a block diagram illustrating an example of a multiple-input multiple-output (MIMO) communication system including a base station and a UE, in accordance with various aspects of the present disclosure.

FIG. 5 is a block diagram of a MIMO communication system 500 including a base station 102 and a UE 104. The MIMO communication system 500 may illustrate aspects of the wireless communication access network 100 described with reference to FIG. 1. The base station 102 may be an example of aspects of the base station 102 described with reference to FIG. 1. The base station 102 may be equipped with antennas 534 and 535, and the UE 104 may be equipped with antennas 552 and 553. In the MIMO communication system 500, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 520 may receive data from a data source. The transmit processor 520 may process the data. The transmit processor 520 may also generate control symbols or reference symbols. A transmit MIMO processor 530 may perform spatial processing (e.g., precoding) on data symbols, control symbols, or reference symbols, if applicable, and may provide output symbol streams to the transmit modulator/demodulators 532 and 533. Each modulator/demodulator 532 through 533 may process a respective output symbol stream (e.g., for OFDM, etc.) to obtain an output sample stream. Each modulator/demodulator 532 through 533 may further process (e.g., convert to analog, amplify, filter, and upconvert) the output sample stream to obtain a DL signal. In one example, DL signals from modulator/demodulators 532 and 533 may be transmitted via the antennas 534 and 535, respectively.

The UE 104 may be an example of aspects of the UEs 104 described with reference to FIGS. 1-2. At the UE 104, the UE antennas 552 and 553 may receive the DL signals from the base station 102 and may provide the received signals to the modulator/demodulators 554 and 555, respectively. Each modulator/demodulator 554 through 555 may condition (e.g., filter, amplify, downconvert, and digitize) a respective received signal to obtain input samples. Each modulator/demodulator 554 through 555 may further process the input samples (e.g., for OFDM, etc.) to obtain received symbols. A MIMO detector 556 may obtain received symbols from the modulator/demodulators 554 and 555, perform MIMO detection on the received symbols, if applicable, and provide detected symbols. A receive (Rx) processor 558 may process (e.g., demodulate, deinterleave, and decode) the detected symbols, providing decoded data for the UE 104 to a data output, and provide decoded control information to a processor 580, or memory 582.

The processor 580 may in some cases execute stored instructions to instantiate a communicating component 242 (see e.g., FIGS. 1 and 2).

On the uplink (UL), at the UE 104, a transmit processor 564 may receive and process data from a data source. The transmit processor 564 may also generate reference symbols for a reference signal. The symbols from the transmit processor 564 may be precoded by a transmit MIMO processor 566 if applicable, further processed by the modulator/demodulators 554 and 555 (e.g., for SC-FDMA, etc.), and be transmitted to the base station 102 in accordance with the communication parameters received from the base station 102. At the base station 102, the UL signals from the UE 104 may be received by the antennas 534 and 535, processed by the modulator/demodulators 532 and 533, detected by a MIMO detector 536 if applicable, and further processed by a receive processor 538. The receive processor 538 may provide decoded data to a data output and to the processor 540 or memory 542.

The processor 540 may in some cases execute stored instructions to instantiate a communicating component 242 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 500. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 500.

The following aspects are illustrative only and aspects thereof may be combined with aspects of other embodiments or teaching described herein, without limitation.

Aspect 1 is a method for wireless communication of a node including configuring a beam for communicating over a wireless channel, where the beam is associated with a channel access class based on a threshold for channel access and having at least one of a defined maximum COT or a defined minimum gap between communications, and communicating over the wireless channel using the beam and based on at least one of the defined COT or the defined minimum gap.

In Aspect 2, the method of claim 1 includes where the threshold for channel access corresponds to a threshold for narrow-beam channel access without using LBT.

In Aspect 3, the method of Aspect 2 includes where the beam is associated with the channel access class based on a determination that at least one of an EIRP spherical measurement, or a CDF thereof, of the beam achieves the threshold.

In Aspect 4, the method of Aspect 3 includes where at least one of the EIRP spherical measurement, or the CDF thereof, of the beam is hardcoded in a memory of the node.

In Aspect 5, the method of any of Aspects 2 to 4 includes where the node stores a configuration of multiple channel access classes to thresholds for narrow-beam channel access without using LBT, and where the beam is associated with the channel access class based on determining the channel access class from the configuration for which at least one of the EIRP spherical measurement, or the CDF thereof, achieves a corresponding threshold of the thresholds.

In Aspect 6, the method of Aspect 5 includes where the configuration indicates at least one of the defined COT or the defined minimum gap as associated with the channel access class.

In Aspect 7, the method of any of Aspects 5 or 6 includes where the configuration indicates a smallest gap for a highest priority channel access class of the channel access classes.

In Aspect 8, the method of any of Aspects 5 or 6 includes where the configuration indicates a largest gap for a highest priority channel access class of the channel access classes.

In Aspect 9, the method of any of Aspects 5 or 6 includes where the configuration indicates a same gap for each of the channel access classes.

In Aspect 10, the method of any of Aspects 5 to 9 includes where the configuration indicates, for a channel access class of the channel access classes having a highest threshold, at least one of no limit on the defined COT or a defined minimum gap of zero.

In Aspect 11, the method of any of Aspects 5 to 10 includes where the configuration indicates the defined minimum gap as a fixed gap for multiple ones of the channel access classes.

In Aspect 12, the method of any of Aspects 5 to 10 includes where the configuration indicates the defined minimum gap for each of the channel access classes as proportional to the defined COT for each of the channel access classes, wherein the defined COT for each of the channel access classes is less than or equal to a defined maximum COT for each of the channel access classes.

In Aspect 13, the method of any of Aspects 5 to 10 includes where the configuration indicates the defined minimum gap for each of the channel access classes as a minimum of a fixed gap or a proportional gap that is proportional to the defined COT for each of the channel access classes, wherein the defined COT for each of the channel access classes is less than or equal to a defined maximum COT for each of the channel access classes.

In Aspect 14, the method of any of Aspects 5 to 10 includes where the configuration indicates the defined minimum gap for each of the channel access classes as a maximum of a fixed gap or a proportional gap that is proportional to the defined COT for each of the channel access classes, wherein the defined COT for each of the channel access classes is less than or equal to a defined maximum COT for each of the channel access classes.

In Aspect 15, the method of any of Aspects 5 to 14 includes receiving the configuration from another node.

Aspect 16 is an apparatus for wireless communication including a transceiver, a memory configured to store instructions, and one or more processors communicatively coupled with the memory and the transceiver, where the one or more processors are configured to execute the instructions to cause the apparatus to perform any of the methods of Aspects 1 to 15.

Aspect 17 is an apparatus for wireless communication including means for performing any of the methods of Aspects 1 to 15.

Aspect 18 is a computer-readable medium including code executable by one or more processors for wireless communications, the code including code for performing any of the methods of Aspects 1 to 15.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
a transceiver;
a memory configured to store instructions; and
one or more processors communicatively coupled with the memory and the transceiver, wherein the one or more processors are configured to execute the instructions to cause the apparatus to:
configure a beam for communicating over a wireless channel using narrow-beam channel access without performing listen-before-talk (LBT), wherein the beam is associated with a channel access class based on a threshold for channel access and having at least one of a defined maximum channel occupancy time (COT) or a defined minimum gap between communications;
wherein the threshold for channel access corresponds to a threshold for the narrow-beam channel access without using LBT;
wherein the memory stores a configuration of multiple channel access classes to thresholds for narrow-beam channel access without using LBT, and wherein the beam is associated with the channel access class based on determining the channel access class from the configuration for which at least one of an effective isotropic radiated power (EIRP) spherical measurement, or a cumulative distribution function (CDF) thereof, achieves a corresponding threshold of the thresholds; and
communicate over the wireless channel using the beam without performing LBT and based on at least one of the defined maximum COT or the defined minimum gap.

2. The apparatus of claim 1, wherein the beam is associated with the channel access class based on a determination that at least one of an effective isotropic radiated power (EIRP) spherical measurement, or a cumulative distribution function (CDF) thereof, of the beam achieves the threshold.

3. The apparatus of claim 2, wherein at least one of the EIRP spherical measurement, or the CDF thereof, of the beam is hardcoded in a memory of the apparatus.

4. The apparatus of claim 1, wherein the configuration indicates at least one of the defined maximum COT or the defined minimum gap as associated with the channel access class.

5. The apparatus of claim 1, wherein the configuration indicates a smallest gap for a highest priority channel access class of the channel access classes.

6. The apparatus of claim 1, wherein the configuration indicates a largest gap for a highest priority channel access class of the channel access classes.

7. The apparatus of claim 1, wherein the configuration indicates a same gap for each of the channel access classes.

8. The apparatus of claim 1, wherein the configuration indicates, for a channel access class of the channel access classes having a highest threshold, at least one of no limit on the defined maximum COT or a defined minimum gap of zero.

9. The apparatus of claim 1, wherein the configuration indicates the defined minimum gap as a fixed gap for multiple ones of the channel access classes.

10. The apparatus of claim 1, wherein the configuration indicates the defined minimum gap for each of the channel access classes as proportional to the defined maximum COT for each of the channel access classes, wherein the defined maximum COT for each of the channel access classes is less than or equal to a defined maximum COT for each of the channel access classes.

11. The apparatus of claim 1, wherein the configuration indicates the defined minimum gap for each of the channel access classes as a minimum of a fixed gap or a proportional gap that is proportional to the defined maximum COT for each of the channel access classes, wherein the defined maximum COT for each of the channel access classes is less than or equal to a defined maximum COT for each of the channel access classes.

12. The apparatus of claim 1, wherein the configuration indicates the defined minimum gap for each of the channel access classes as a maximum of a fixed gap or a proportional gap that is proportional to the defined maximum COT for each of the channel access classes, wherein the defined maximum COT for each of the channel access classes is less than or equal to a defined maximum COT for each of the channel access classes.

13. The apparatus of claim 1, wherein the one or more processors are configured to execute the instructions to cause the apparatus to receive the configuration from another node.

14. A method for wireless communication of a node, comprising:
 configuring a beam for communicating over a wireless channel using narrow-beam channel access without performing listen-before-talk (LBT), wherein the beam is associated with a channel access class based on a threshold for channel access and having at least one of a defined maximum channel occupancy time (COT) or a defined minimum gap between communications;
 wherein the threshold for channel access corresponds to a threshold for the narrow-beam channel access without using LBT;
 wherein the node stores a configuration of multiple channel access classes to thresholds for narrow-beam channel access without using LBT, and wherein the beam is associated with the channel access class based on determining the channel access class from the configuration for which at least one of an effective isotropic radiated power (EIRP) spherical measurement, or a cumulative distribution function (CDF) thereof, achieves a corresponding threshold of the thresholds; and
 communicating over the wireless channel using the beam without performing LBT and based on at least one of the defined maximum COT or the defined minimum gap.

15. The method of claim 14, wherein the beam is associated with the channel access class based on a determination that at least one of an effective isotropic radiated power (EIRP) spherical measurement, or a cumulative distribution function (CDF) thereof, of the beam achieves the threshold.

16. The method of claim 15, wherein at least one of the EIRP spherical measurement, or the CDF thereof, of the beam is hardcoded in a memory of the node.

17. The method of claim 14, wherein the configuration indicates at least one of the defined maximum COT or the defined minimum gap as associated with the channel access class.

18. The method of claim 14, wherein the configuration indicates a smallest gap for a highest priority channel access class of the channel access classes.

19. The method of claim 14, wherein the configuration indicates a largest gap for a highest priority channel access class of the channel access classes.

20. The method of claim 14, wherein the configuration indicates a same gap for each of the channel access classes.

21. The method of claim 14, wherein the configuration indicates, for a channel access class of the channel access classes having a highest threshold, at least one of no limit on the defined maximum COT or a defined minimum gap of zero.

22. The method of claim 14, wherein the configuration indicates the defined minimum gap as a fixed gap for multiple ones of the channel access classes.

23. The method of claim 14, wherein the configuration indicates the defined minimum gap for each of the channel access classes as proportional to the defined maximum COT for each of the channel access classes, wherein the defined maximum COT for each of the channel access classes is less than or equal to a defined maximum COT for each of the channel access classes.

24. The method of claim 14, wherein the configuration indicates the defined minimum gap for each of the channel access classes as a minimum of a fixed gap or a proportional gap that is proportional to the defined maximum COT for each of the channel access classes, wherein the defined maximum COT for each of the channel access classes is less than or equal to a defined maximum COT for each of the channel access classes.

25. An apparatus for wireless communication, comprising:
 means for configuring a beam for communicating over a wireless channel using narrow-beam channel access without performing listen-before-talk (LBT), wherein the beam is associated with a channel access class based on a threshold for channel access and having at least one of a defined maximum channel occupancy time (COT) or a defined minimum gap between communications;
 wherein the threshold for channel access corresponds to a threshold for the narrow-beam channel access without using LBT;
 wherein the apparatus stores a configuration of multiple channel access classes to thresholds for narrow-beam channel access without using LBT, and wherein the beam is associated with the channel access class based on determining the channel access class from the configuration for which at least one of an effective isotropic radiated power (EIRP) spherical measurement, or a cumulative distribution function (CDF) thereof, achieves a corresponding threshold of the thresholds; and
 means for communicating over the wireless channel without performing LBT using the beam and based on at least one of the defined maximum COT or the defined minimum gap.

26. One or more non-transitory computer-readable media comprising code executable by one or more processors for wireless communications, the code comprising code for:
- configuring a beam for communicating over a wireless channel using narrow-beam channel access without performing listen-before-talk (LBT), wherein the beam is associated with a channel access class based on a threshold for channel access and having at least one of a defined maximum channel occupancy time (COT) or a defined minimum gap between communications;
- wherein the threshold for channel access corresponds to a threshold for the narrow-beam channel access without using LBT;
- wherein a memory coupled with the one or more processors stores a configuration of multiple channel access classes to thresholds for narrow-beam channel access without using LBT, and wherein the beam is associated with the channel access class based on determining the channel access class from the configuration for which at least one of an effective isotropic radiated power (EIRP) spherical measurement, or a cumulative distribution function (CDF) thereof, achieves a corresponding threshold of the thresholds; and
- communicating over the wireless channel without performing LBT using the beam and based on at least one of the defined maximum COT or the defined minimum gap.

* * * * *